US008413105B2

(12) United States Patent
Adi et al.

(10) Patent No.: US 8,413,105 B2
(45) Date of Patent: Apr. 2, 2013

(54) DEVICE, METHOD AND COMPUTER PROGRAM PRODUCT FOR MANAGING A SOFTWARE DEVELOPMENT PROCESS

(75) Inventors: Asaf Adi, Qiryat Ata (IL); Jonathan Bnayahu, Haifa (IL); Inbal Ronen, Haifa (IL); Avi Yaeli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 11/876,785

(22) Filed: Oct. 23, 2007

(65) Prior Publication Data

US 2009/0106729 A1 Apr. 23, 2009

(51) Int. Cl.
*G06F 9/44* (2006.01)
(52) U.S. Cl. .......................... 717/101; 717/120; 717/123
(58) Field of Classification Search .................. 717/101, 717/120, 123
See application file for complete search history.

(56) References Cited

U.S. PATENT DOCUMENTS

| 5,740,440 | A  | * | 4/1998  | West            | 717/125 |
|-----------|----|---|---------|-----------------|---------|
| 6,347,374 | B1 |   | 2/2002  | Drake et al.    |         |
| 7,069,541 | B2 | * | 6/2006  | Dougherty et al.| 717/122 |
| 7,487,494 | B2 | * | 2/2009  | Chan et al.     | 717/127 |
| 7,810,067 | B2 | * | 10/2010 | Kaelicke et al. | 717/102 |
| 7,890,924 | B2 | * | 2/2011  | Raffo           | 717/105 |
| 8,146,100 | B2 | * | 3/2012  | Kilian-Kehr     | 719/318 |
| 2003/0018643 | A1 |   | 1/2003  | Mi et al.        |         |
| 2004/0143811 | A1 | * | 7/2004  | Kaelicke et al.  | 717/101 |
| 2004/0160103 | A1 | * | 8/2004  | Aono             | 297/330 |
| 2004/0177053 | A1 |   | 9/2004  | Donoho et al.    |         |
| 2004/0230964 | A1 | * | 11/2004 | Waugh et al.     | 717/168 |
| 2007/0226755 | A1 | * | 9/2007  | Kilian-Kehr      | 719/318 |
| 2008/0148231 | A1 | * | 6/2008  | Weber            | 717/120 |
| 2009/0043592 | A1 | * | 2/2009  | Heimann et al.   | 705/1   |

FOREIGN PATENT DOCUMENTS

WO WO2007035452 A1 3/2007

OTHER PUBLICATIONS

Li et al., "Total Quality Management in Software Development Process", vol. 14, No. 1, Jan. 2000, pp. 4-6 & 34-41.*
Jeffrey J. P. Tsai, "A Knowledge-Based System for Software Design", vol. 6, No. 5, Jun. 1988.*
Haag et al., "A Deontic Formalism for Co-ordinating Software Development in Virtual Software Corporation", 1998.*
Vladan Devedzic, "Software Project Management", 2007.*
Jerry W. Steinhardt, "Enterprise wide alert system: a pro-active approach", CMG Proceedings, v 1, 1994, p. 353-361.
J.P. Rouillard, "Real-time log file analysis using the Simple Event Correlator (SEC)", Proceedings of the Eighteenth Large Installation System Administration Conference (LISA XVIII), 2004, 133-49.

* cited by examiner

*Primary Examiner* — Phillip H Nguyen

(57) ABSTRACT

A method for managing a software development process, the method includes: receiving information representative of instances of simple software development process events; detecting, by a complex event processing (CEP) engine and in response to the received information, at least one complex situation; and invoking at least one software management process reaction responsive to a detection of the at least one complex situation.

20 Claims, 2 Drawing Sheets generating, receiving or updating a complex event processing (CEP) representation of a software development process. 210 receiving information representative of instances of simple software development process events. 220 detecting, by a complex event processing (CEP) engine and in response to the received information, at least one complex situation. 230 invoking at least one software management process reaction responsive to a detection of the at least one complex situation. 240

DEVICE, METHOD AND COMPUTER PROGRAM PRODUCT FOR MANAGING A SOFTWARE DEVELOPMENT PROCESS

FIELD OF THE INVENTION

The present invention relates to a method, a device and a computer program product for managing a software development process.

BACKGROUND OF THE INVENTION

A software development process is a structure imposed on the development of a software product. Synonyms include software lifecycle and software process. There are several models for the software development process, each describing approaches to a variety of tasks or activities that take place during the process. One model is known as the "waterfall" model. It describes a sequence of tasks (or phases) that may include: stating of requirements, analyzing requirements, designing a solution, architecting a software framework for the solution, developing code, testing, deploying the code, and finally performing a post implementation task such as supporting the code.

The different phases substantially differ from each other. Each phase includes tasks that are performed by different roles. Typically software development tools support specific roles and their relevant tasks and activities in the lifecycle. Table 1 illustrates some state of the art software development tools of IBM and others, and the phases or disciplines that they support.

| Phase or Discipline | Software development tools |
| --- | --- |
| Project Management | IBM Rational Portfolio Manager, Microsoft Project |
| Requirements | IBM Rational Requisite Pro |
| Modeling & Development | IBM Rational Application Developer, IBM Rational Software Architect, Microsoft Visual Studio |
| Business Modeling | WebSphere Business Modeler |
| Testing | IBM Rational Robot |
| Build | IBM Rational BuildForge |
| Source Code Management | IBM Rational ClearCase |
| Defect Management | IBM Rational ClearQuest |
| Asset Management | WebSphere Studio Asset Analyzer, Rational Asset Manager |
| Customer Relationship Management (CRM) | NetResults Tracker (customer support and helpdesk module) |
| Collaboration | Lotus Sametime |

Some of the mentioned above tools are passive in nature. They check a compliance of a monitored software development phase to a predefined phase scenario—they may indicate that a file must be checked-out before it is edited, that a defect must be opened before a file can be checked-out.

These software development task monitors do not actively look for exceptions to the software development phases. They are also limited in their monitoring capabilities to monitoring an occurrence of simple event instances.

For example, a project leader cannot be alerted by a software development task monitor when: (i) a defect is reassigned more than X times, (ii) a design document was not checked-in X days after a requirement was approved, (iii) check-out attempts on a file were denied more than X times by Y people (which can imply that the file was locked by someone else at the time).

In addition, software development task monitors do not collaborate and do not support a detection of a complex situation that can be responsive to event instances detected by different software development task monitors.

There is a need to provide efficient methods, systems and computer program products for efficiently managing a software development process.

SUMMARY OF THE PRESENT INVENTION

A method for managing a software development process, the method includes: receiving information representative of instances of simple software development process events; detecting, by a complex event processing (CEP) engine and in response to the received information, at least one complex situation; and invoking at least one software management process reaction responsive to a detection of the at least one complex situation.

BRIEF DESCRIPTION OF THE DRAWINGS

The present invention will be understood and appreciated more fully from the following detailed description taken in conjunction with the drawings in which:

FIG. 2 is a flow chart of a method for evaluating a software development process, according to an embodiment of the invention.

DETAILED DESCRIPTION OF THE DRAWINGS

Figure 1:
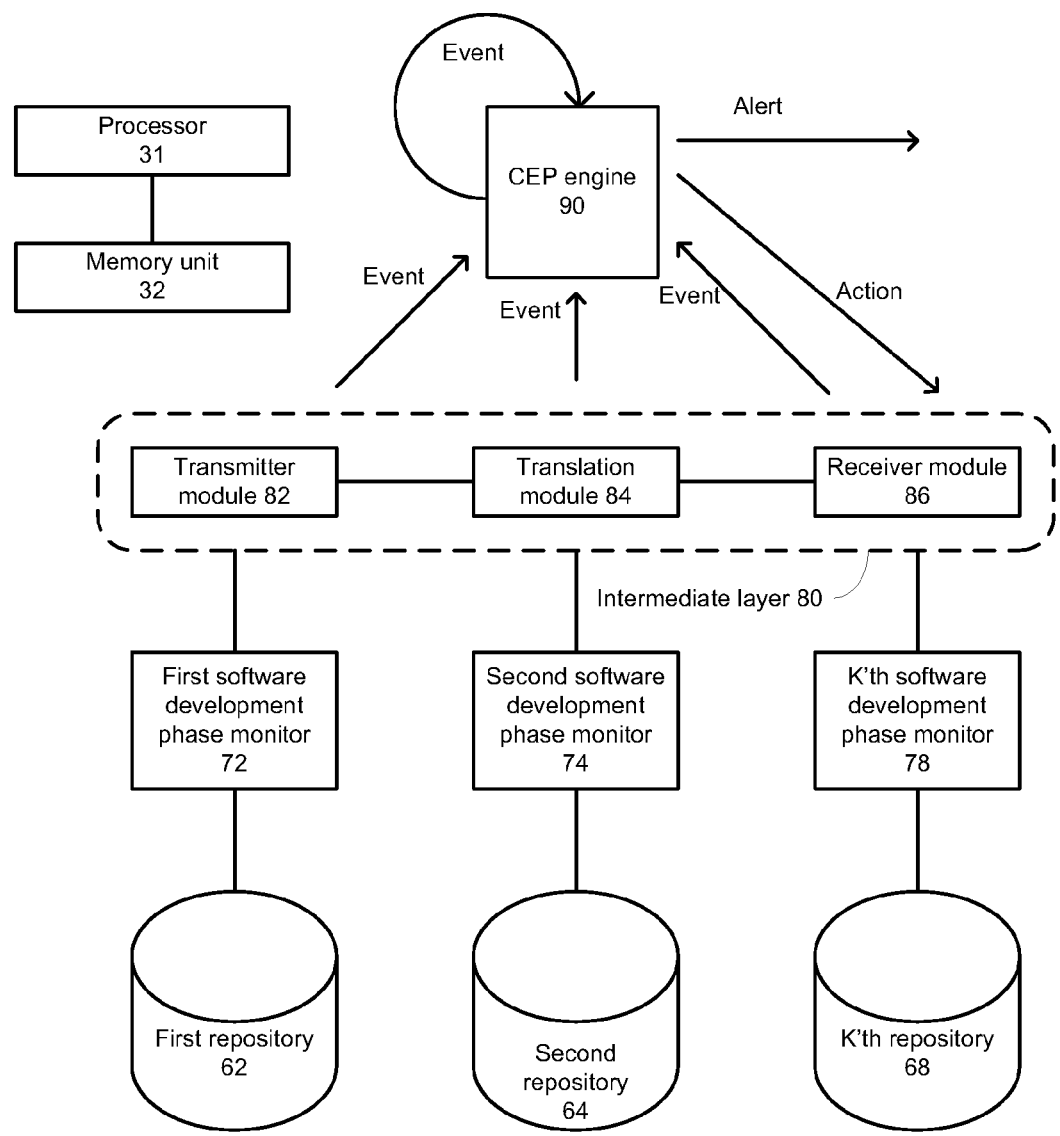
FIG. 1 is a block diagram of a system for evaluating a software development process, according to an embodiment of the invention.

According to an embodiment of the invention a complex event processing (CEP) engine is used in order to manage a software development process. A CEP engine detects situations in response to instances of simple software development process events that are reported by software development task monitors. These situations can be complex situations. In response to detected situations the CEP engine can generate alerts or initiate an action. The CEP engine can detect that a certain action that should have occurred did not occur and in response generate an alert or initiate a reaction.

The events can be the result of a user action, or of an automatic or scheduled action. For example, a file check-out event, a file check-in event, a build starting, a build succeeding or failing, an instant message sent, a defect opened, a defect transferred to another owner, a requirement created, a requirement accepted, and so on.

U.S. Pat. No. 6,604,093 whose disclosure is incorporated herein by reference, describes a situation management system that is referred to as a CEP engine. The CEP engine uses a language that enables complex events to be defined as the composition of multiple simple events. In addition, a particular order and other timing constraints on the component events may be specified. Once the complex event has been detected, there may be one or more conditions that qualify the event, for example, that the amounts of the withdrawals be greater than a specified threshold. If the conditions are satisfied, then an action is triggered. U.S. Pat. No. 6,604,093 defines a specified composition of events together with the conditions attached to these events as a "situation." The present patent application uses this definition, as well.

The CEP engine described in U.S. Pat. No. 6,604,093 provides tools for defining intervals during which a given situation is meaningful and for detecting and reacting to the occurrence of the situation during such intervals. An interval of this sort is referred to as a "lifespan." A lifespan begins with an initiating event, or initiator, and ends with a terminating event, or terminator. The situation management system enables manipulation of the initiator and terminator, such as by attachment of conditions to the initiating and terminating events. The situation management system also defines quantifiers, indicating how the system is to respond to repeated occurrences of a given event in a given lifespan.

Aspects of the CEP engine described in U.S. Pat. No. 6,604,093 are implemented in IBM Active Middleware Technology™ (AMiT), a situation management tool developed at IBM Haifa Research Laboratory (Haifa, Israel). AMiT is described in an article by Adi and Etzion entitled, "AMiT—the Situation Manager," VLDB Journal 13(2) (Springer-Verlag, May, 2004), pages 177-203, which is incorporated herein by reference.

FIG. 1 illustrates system 10 for evaluating a software development process, according to an embodiment of the invention.

FIG. 1 illustrates both hardware components (processor 31 and memory unit 32) as well as various software or middleware modules (CEP engine 90, transmission module 82, translation module 84, reception module 86, first software development task monitor 72, second software development task monitor 74, K'th software development task monitor 78) and data structures (first repository 62, second repository 64 and K'th repository 68).

It is noted that processor 31 can executed CEP engine 90 as well as other software and/or firmware modules but this is not necessarily so and different processors can executed these modules. While memory unit 32 can store that various data structures as well as code, this is not necessarily so and the information can be stored in different memory units.

Intermediate layer 80 interfaces between CEP engine 90 and the various software development task monitors 72, 74 and 78. Intermediate layer 80 includes transmission module 82, translation module 84 and reception module 86.

Each software development task monitor can have its own language and different software development task monitors can describe the same event in different terms. Translation module 84 correlates between the different descriptions of the same events. It provides a unified description of events to CEP engine 90 and translates instructions (to perform actions) from CEP engine 90 to the terminology of the software development task monitor that is expected to perform that action.

System 10 may represent practically any type of computer, computer system or other programmable electronic system. System 10 may be connected in a network or may be a stand-alone system in the alternative.

Conveniently, CEP engine 50 is implemented in software that is executed by processor 31. When executing CEP engine 50 processor 31 can: (i) receive information representative of instances of simple software development process events; (ii) detect, by utilizing a complex event processing (CEP) engine and in response to the received information, at least one complex situation; and (iii) invoke at least one software management process reaction responsive to a detection of the at least one complex situation.

The following provide sample situations that should be detected by CEP engine 50 as well as sample alerts and/or actions initiated or generated by CEP engine 50:

1. A defect is reassigned more than a predefined threshold (single defect reassignment reported by code management monitor).
2. A customer reported issue is opened (event reported by CRM monitor), and within a predefined period no defect was opened in the defect system (defect openings are reported defect management monitor)
    i. CEP engine can send an alert to relevant owners. Additionally or alternatively the CEP engine can act by raise the priority of the customer reported issue.
3. A defect was opened (defect management monitor reports of opening the defect) based on a customer reported issue, but a certain period before the due date of the issue (event reported by CRM monitor), the defect is not closed and shows little check-in/check-out activity (defect closure event reported by the defect management monitor, check-in/check-out events reported by the code management monitor).
    i. CEP engine can send an alert to customer and/or relevant owners. Additionally or alternatively the CEP engine can act by updating the due date, and/or raising defect priority.
4. The build fails X times in Y days (build failures reported by build monitor) due to check-ins of the same developer (events reported by the code management monitor)
    i. CEP engine can send an alert to a developer and after certain occurrences notify development manager.
5. A test failed to run (event reported by the test monitor) but no defect was opened within a certain period (event reported by the defect management monitor).
6. A developer makes many changes (number of changes exceeds threshold) in his local workspace (events reported by the IDE monitor), which belong to a stream that will be integrated into a release due in few (less than a threshold) days or hours (events reported by the code management monitor).
7. A check-in event on a file triggers a massive change in the system (>X assets), according to a change impact analysis done in WSAA.
8. Many changes (>X check-in, check-out, branch events) in an asset that is published in RAM.

FIG. 2 is a flow chart of method 200 for managing a software development process, according to an embodiment of the invention.

Method 200 starts by stage 210 of generating, receiving or updating a complex event processing (CEP) representation of a software development process.

Stage 210 is followed by stage 220 of receiving information representative of instances of simple software development process events.

Stage 220 is followed by stage 230 of detecting, by a complex event processing (CEP) engine and in response to the received information, at least one complex situation.

Conveniently, stage 230 includes at least one of the following or a combination thereof: (i) detecting a complex situation in response to instances of events provided from different software development task monitors, each being adapted to monitor a single phase of the software development process, (ii) detecting a complex situation in response to instances of events provided from different software development task monitors, each being adapted to passively monitor a compliance with a predefined software development phase policy, and (iii) detecting a complex situation that represents multiple deviations from an expected software development phase within a predefined time period.

Stage 230 is followed by stage 240 of invoking at least one software management process reaction responsive to a detection of the at least one complex situation.

Conveniently, stage 240 includes at least one of the following or a combination thereof: (i) generating an alert, (ii) invoking an action that affects the software development process, and (iii) invoking a software management process reaction that affects a certain phase of the software development process while the invoking was triggered by information that represents an instance of an event that occurred at a different phase of the software development process.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Conveniently, a computer program product is provided. The computer program product includes a computer usable medium including a computer readable program, wherein the computer readable program when executed on a computer causes the computer to: (i) receive information representative of instances of simple software development process events; (ii) detect, by a complex event processing (CEP) engine and in response to the received information, at least one complex situation; and (iii) invoke at least one software management process reaction responsive to a detection of the at least one complex situation.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for monitoring a software development process and invoking at least one software management process reaction, the method comprises:
   receiving, from a plurality of software development task monitors which monitor a plurality of different software development tools during a software development process, information representative of a plurality of instances of a plurality of simple software development process events resulting from a plurality of software development actions supported by the plurality of software development tools;
   detecting, during the software development process, by a complex event processing (CEP) engine and in response to an analysis of the received information, at least one complex situation; and
   invoking at least one software management process reaction responsive to the detection of the at least one complex situation.

2. The method according to claim 1 wherein the stage of invoking comprises generating an alert.

3. The method according to claim 1 wherein the stage of invoking comprises invoking an action that affects the software development process.

4. The method according to claim 1 wherein the detecting comprises detecting a complex situation in response to instances of events provided from the plurality of different software development task monitors, each being adapted to monitor a single phase of the software development process.

5. The method according to claim 1 wherein the detecting comprises detecting a complex situation in response to instances of events provided from the plurality of different software development task monitors, each being adapted to passively monitor a compliance with a predefined software development phase policy.

6. The method according to claim 1 wherein the detecting comprises detecting a complex situation that represents multiple deviations from an expected software development phase within a predefined time period.

7. The method according to claim 1 wherein the stage of receiving comprises receiving information representative of an instance of an event that occur during a certain phase of the software development process and wherein the stage of invoking comprises invoking a software management process reaction that affects another phase of the software development process.

8. The method according to claim 1 wherein the receiving is preceded by translating event instance information provided by at least one software development task monitor of the plurality of software development task monitors.

9. A non-transitory computer program product for monitoring a software development process and invoking at least one software management process reaction, comprising:
   first program instructions to receive from a plurality of software development task monitors which monitor a plurality of different software development tools during a software development process, information representative of a plurality of instances of a plurality of simple software development process events resulting from a plurality of software development actions supported by the plurality of software development tools;
   second program instructions to detect, during the software development process, by a complex event processing (CEP) engine and in response to an analysis of the received information, at least one complex situation; and
   third program instructions to invoke at least one software management process reaction responsive to a detection of the at least one complex situation; wherein the first, second, and third program instructions are stored on the computer readable storage medium.

10. The computer program product according to claim 9, wherein the computer readable program when executed on a computer causes the computer to generate an alert.

11. The computer program product according to claim 9, wherein the computer readable program when executed on a computer causes the computer to invoke an action that affects the software development process.

12. The computer program product according to claim 9, wherein the computer readable program when executed on a computer causes the computer to detect a complex situation in response to instances of events provided from different software development task monitors, each being adapted to monitor a single phase of the software development process.

13. The computer program product according to claim 9, wherein the computer readable program when executed on a computer causes the computer to detect a complex situation in response to instances of events provided from different software development task monitors, each being adapted to passively monitor a compliance with a predefined software development phase policy.

14. The computer program product according to claim 9, wherein the computer readable program when executed on a computer causes the computer to detect a complex situation that represents multiple deviations from an expected software development phase within a predefined time period.

15. The computer program product according to claim 9, wherein the computer readable program when executed on a computer causes the computer to receive information representative of an instance of an event that occur during a certain phase of the software development process and wherein the stage of invoking comprises invoking a software management process reaction that affects another phase of the software development process.

16. The computer program product according to claim 9, wherein the computer readable program when executed on a computer causes the computer to translate event instance information provided by at least one software development task monitor.

17. A system comprising:
 a memory unit coupled to a processor, wherein the processor is adapted to:
  receive from a plurality of software development task monitors which monitor a plurality of different software development tools, information representative of a plurality of instances of a plurality of simple software development process events resulting from a plurality of software development actions supported by the plurality of software development tools; and
  detect, during the software development process, by utilizing a complex event processing (CEP) engine and in response to the received information, at least one complex situation; and invoke at least one software management process reaction responsive to a detection of the at least one complex situation.

18. The system according to claim 17 wherein the processor is adapted to invoke an action that affects the software development process.

19. The system according to claim 17 wherein the processor is adapted to detect a complex situation in response to instances of events provided from different software development task monitors, each being adapted to passively monitor a compliance with a predefined software development phase policy.

20. The system according to claim 17 wherein the processor is adapted to receive information representative of an instance of an event that occur during a certain phase of the software development process and wherein the stage of invoking comprises invoking a software management process reaction that affects another phase of the software development process.

* * * * *